United States Patent
Peng

(10) Patent No.: US 7,363,637 B2
(45) Date of Patent: Apr. 22, 2008

(54) OPTICAL DISK DRIVE CAPABLE OF DISCHARGING ELECTROSTATIC CHARGES OF A USER

(75) Inventor: Wen-Kuan Peng, Tao-Yuan Hsien (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 321 days.

(21) Appl. No.: 11/162,825

(22) Filed: Sep. 23, 2005

(65) Prior Publication Data
US 2007/0074234 A1 Mar. 29, 2007

(51) Int. Cl.
*G11B 33/14* (2006.01)

(52) U.S. Cl. .................................... 720/650

(58) Field of Classification Search ............... 720/650; 360/96.5, 99.02, 99.03, 99.06, 99.07
See application file for complete search history.

(56) References Cited

U.S. PATENT DOCUMENTS

| 5,684,775 A * | 11/1997 | Tanaka et al. ............. 720/650 |
| 2005/0198659 A1* | 9/2005 | Ahn et al. ................. 720/650 |
| 2006/0225086 A1* | 10/2006 | Yen .......................... 720/650 |

* cited by examiner

*Primary Examiner*—David Davis
(74) *Attorney, Agent, or Firm*—Winston Hsu

(57) ABSTRACT

The present invention is to provide an optical disk drive including a casing, a tray, a signal wire, and a conductive wire. The casing has a first electric device and a grounded conductor, and the tray has a second electric device and a base plate. The signal wire connects the first electric device and the second electric device. The conductive wire is a part of the signal wire to electrically connect the base plate and the conductor. When a user touches the tray, electrostatic charges of the user are grounded by the connection of the base plate and the conductor.

7 Claims, 5 Drawing Sheets

OPTICAL DISK DRIVE CAPABLE OF DISCHARGING ELECTROSTATIC CHARGES OF A USER

BACKGROUND OF THE INVENTION

1. Field of the Invention

The present invention relates to an optical disk drive, and more particularly to an electrostatic discharge protection for the optical disk drive.

2. Description of the Prior Art

With the explosion of information, most multimedia products are issued by the type of optical discs today. In recent years, optical discs have increasingly sold year by year. Each computer almost has an optical disk drive now. Therefore, the optical disk drive is important for the multimedia industry. Due to lightness and thinness, a slim disk drive is adopted in a notebook computer extensively. The precision of the slim disk drive needs to depend on the stability of each component which operates in normal efficiency. So it is important how to increase the quality of the slim disk drive.

In general, a slim disk drive includes a casing and a tray. The casing has a hollow area, which the tray is disposed inside and is able to move in or out. For thinning the slim disk drive, a spindle motor rotating a disc and an optical pick-up are all disposed on the tray. Hence, when a user pushes the eject button on the bezel of the tray to moves the tray out of the casing for exchanging or placing a disc, electrostatic charges of the user are transmitted from the finger to the tray through the gap between the eject button and the bezel. Electric components, such as the spindle motor and the optical pick-up, disposed on the tray are very easily damaged by the action of electrostatic charges.

For preventing components disposed on the tray from being damaged by the electrostatic charges, a prior disk drive is additionally equipped with an electrostatic discharge device to dissipate electrostatic charges. The electrostatic discharge device is just able to dissipate electrostatic charges accumulated on the tray when the tray moves into the casing. However, the additional electrostatic discharge device increases not only the production cost, but also the production time. Meanwhile, the electrostatic discharge device just dissipates electrostatic charges when the tray moves into the casing. Therefore, the prior disk drive can not dissipate electrostatic charges accumulated on the tray all the time.

SUMMARY OF THE INVENTION

It is one object of the invention to provide an optical disk drive which utilizes the original structure for directly discharging electrostatic charges to simplify the structure and lower production cost.

It is another object of the invention to provide an optical disk drive which effectively discharges electrostatic charges of the tray whenever the tray moves in or out of a casing of the optical disk drive.

For achieving the above objects, the present invention is to provide an optical disk drive including a casing, a tray, a signal wire, and a conductive wire. The casing has a first electric device and a grounded conductor, and the tray has a second electric device and a base plate. The signal wire connects the first electric device and the second electric device. The conductive wire is a part of the signal wire to electrically connect the base plate and the conductor. When a user touches the tray, electrostatic charges of the user are grounded by the connection of the base plate and the conductor.

The tray of the invention further includes a bezel having a through hole and a eject button. The eject button is accommodated in the through hole and exposed out of the through hole. When the user touches the eject button, electrostatic charges are conducted to the base plate through the gap between the eject button and the through hole to be grounded. Furthermore, the base plate of the invention includes a first metal plate, which is under the tray to electrically connect with the conductive wire, and a second metal plate, which is disposed at a side of the first metal plate. When the user touches the tray, electrostatic charges are grounded through the second metal plate. The aforesaid second metal plate and first metal plate can be formed as a whole. Besides, the signal wire of the invention could be a flexible printed circuit (FPC), the first electric device could be a connector, and the second electric device could be an optical pick-up.

Further features and advantages of the invention, as well as the structure and operation of various embodiments of the invention, are described in detail below with reference to the accompanying drawings.

DETAILED DESCRIPTION

Figure 1A:
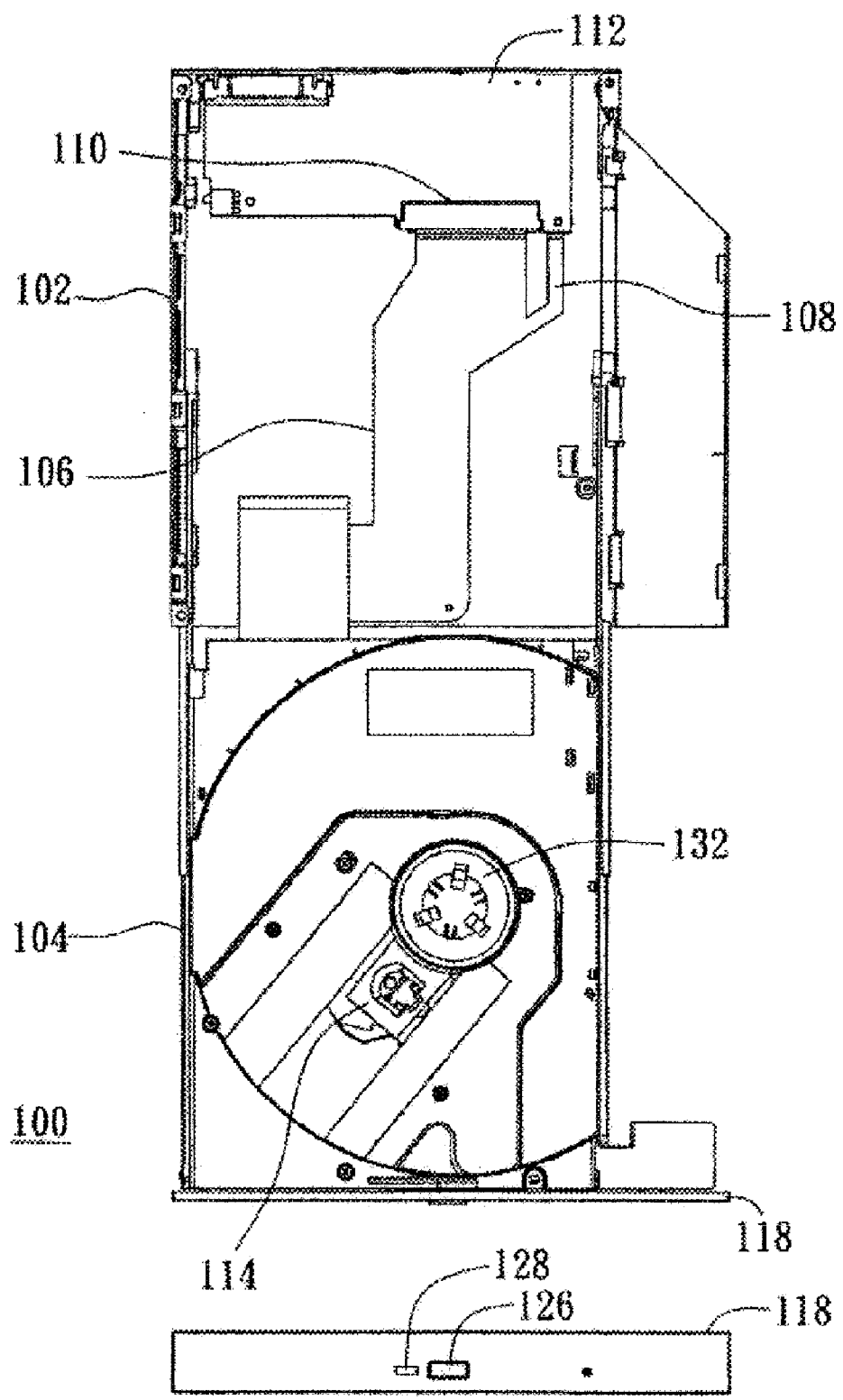
FIG. 1A is a top view and front view of the optical disk drive according to the present invention.
Figure 1B:
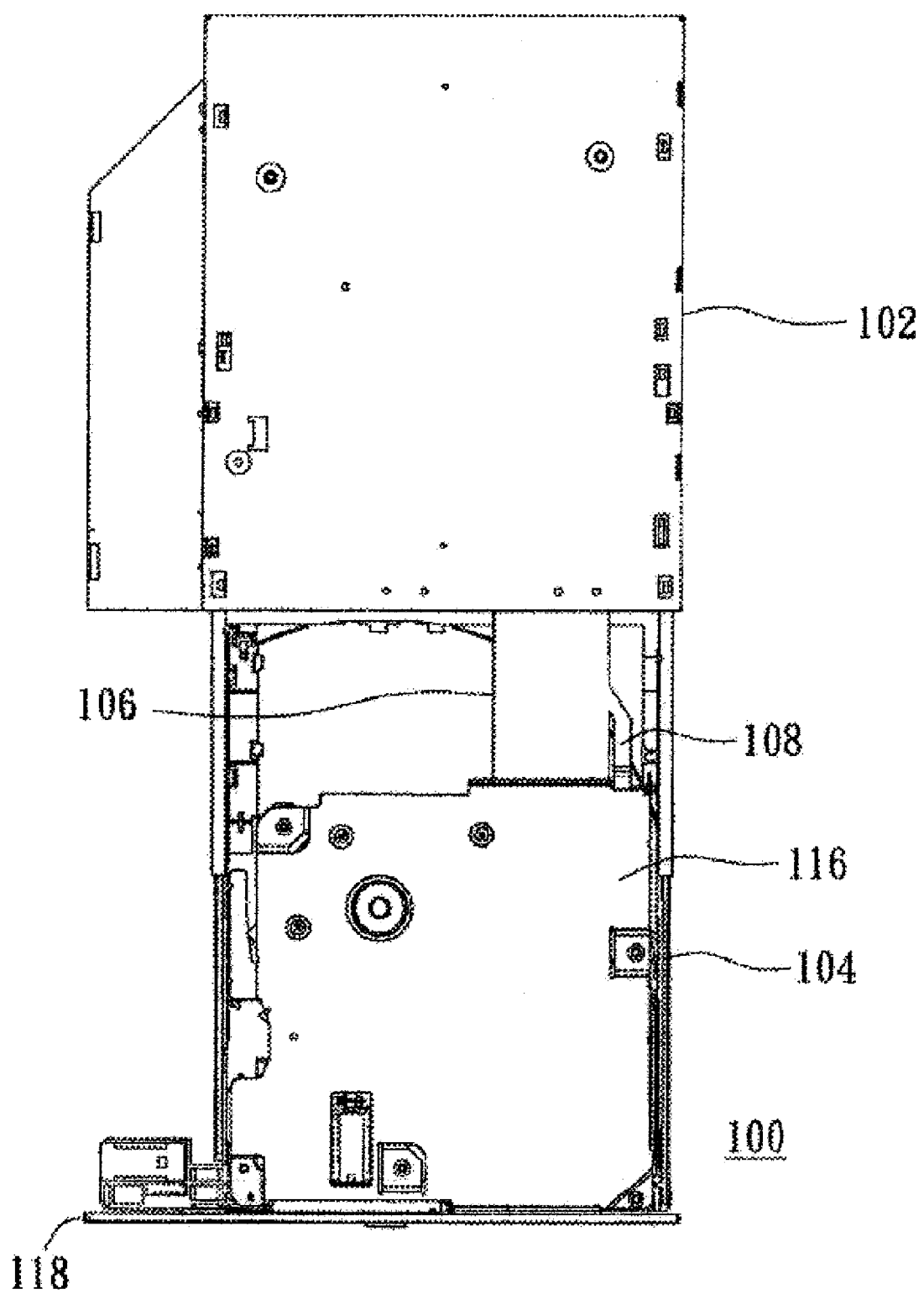
FIG. 1B is a bottom view of the optical disk drive according to the present invention.

Referring to FIG. 1A and FIG. 1B, an optical disk drive 100 of the invention is suitable for a notebook computer. The optical disk drive 100 includes a casing 102, a tray 104, a signal wire 106, and a conductive wire 108. The signal wire 106 is a FPC, such as a U-shaped FPC. The conductive wire 108, a part of the signal wire 106, is separated from the signal wire 106 at the head and the trail. The casing 102 has a first electric device 110, such as a connector, and a grounded conductor 112, such as a main control board of the optical disk drive 100.

The tray 104 is disposed in the casing 102 to move in or out. The tray 104 includes a second electric device 114, such as an optical pick-up, a base plate 116, and a bezel 118. The second electric device 114 is disposed on the tray 104, and the base plate 116 is disposed under the tray 104 to prevent components form exposure and electromagnetic interference.

Figure 2:
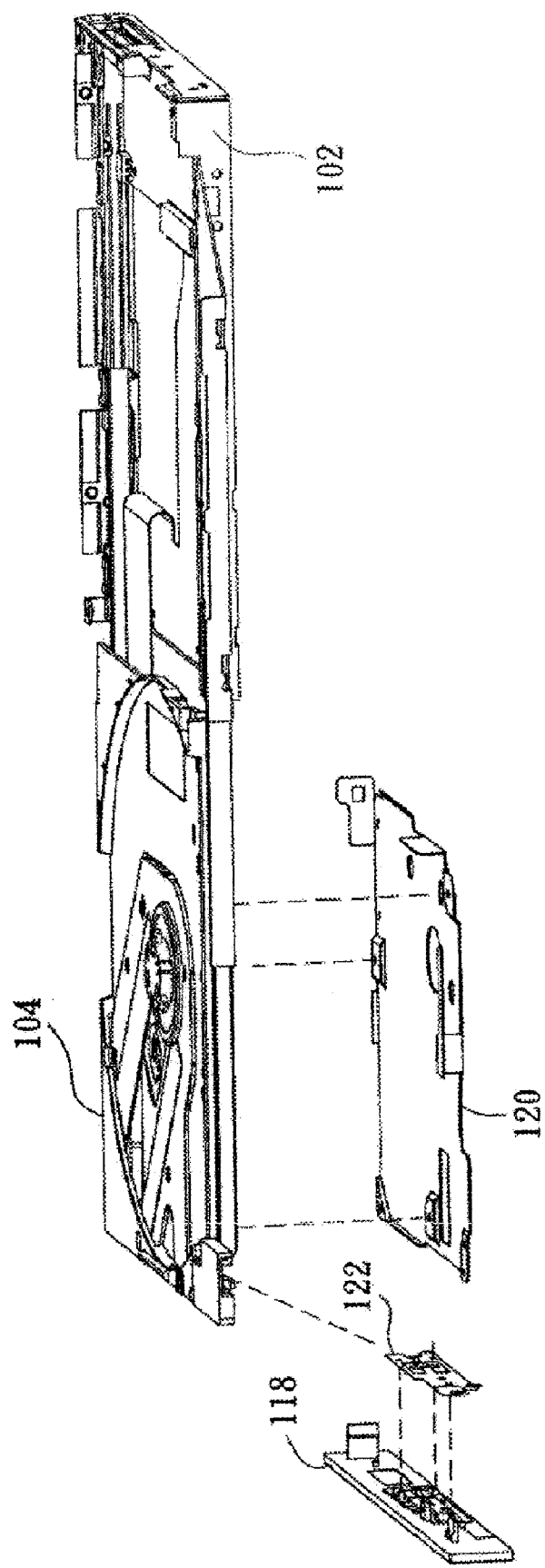
FIG. 2 is an exploded view of the optical disk drive according to the present invention.
Figures 3A, 3B:
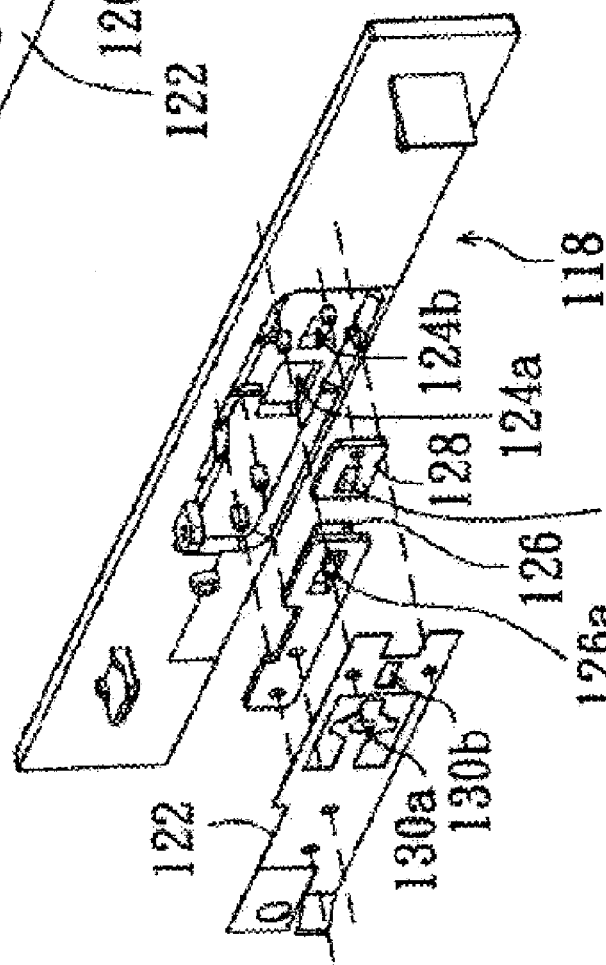
FIG. 3A is an relative position of the bezel and the second metal plate of the optical disk drive according to the present invention.
FIG. 3B is an assembly of the bezel and the second metal plate in FIG. 3A.

Referring to FIG. 2, the base plate 116 includes a first metal plate 120 under the tray 104 and a second metal plate 122 at a side of the first metal plate 120. The bezel 118 next to the second metal plate 122 is disposed at a side of the tray 104. Please refer to FIG. 3A and FIG. 3B at the same time. The bezel 118 includes through holes 124a and 124b, an eject button 126, and a display cover 128. The eject button 126 and the display cover 128 are individually accommodated in the through holes 124a and 124b, and are exposed from the through holes 124a and 124b. The second metal plate 122 is disposed at the side of the first metal plate 120, and is coupled with the first metal plate 120. The second metal plate 122 has openings 130a and 130b, relative to the eject button 126 and the display cover 128, to expose the end 126a of the eject button 126 and the end 128a of the display cover 128.

Please refer to FIG. 1A, FIG. 1B and FIG. 3A at the same time again. The optical disk drive 100 utilizes the conductive wire 108 of the signal wire 106, which electrically connects the second electric device 114 on the tray 104 with the first electric device 110 on the casing 102, to electrically connect the base plate 116 under the tray 104 with the conductor 112 or the casing 102 if the casing 102 is conductive material. When the user pushes the eject button 126 or touches the display cover 128, electrostatic charges of the user are conducted to the second metal plate 122 through the gap between the eject button 126 and the through hole 124a, or through the gap between the display cover 128 and the through hole 124a. Then, the electrostatic charges successively pass the first metal plate 120 and the conductive wire 108 to the conductor 112, or directly conduct to the casing 102 for grounding to discharge.

When the tray 104 is out of the casing 120, as shown in FIG. 1A and FIG. 1B, the electrostatic charges of the user also can be discharged through the connection of the conductive wire 108 and the first metal plate 120. Therefore, according to the embodiment of the present invention, the electrostatic charges on the tray 104 can be discharged whenever the tray 104 of the optical disk drive 100 is inside or outside the casing 102.

Besides, because the conductive wire 108 is disposed in the signal wire 106 which is a flexible printed circuit, there are not any wire problems necessary to arrange. When manufacturing the signal wire 106, the conductive wire 108 can previously be made together with the signal wire 106. So the cost of the additional alignment of the conductive wire 108 can be saved. In addition, the base plate 116 is used as a conductive component not only to reduce the production cost, but preventing the optical disk drive from enlarging the volume.

Figure 4:
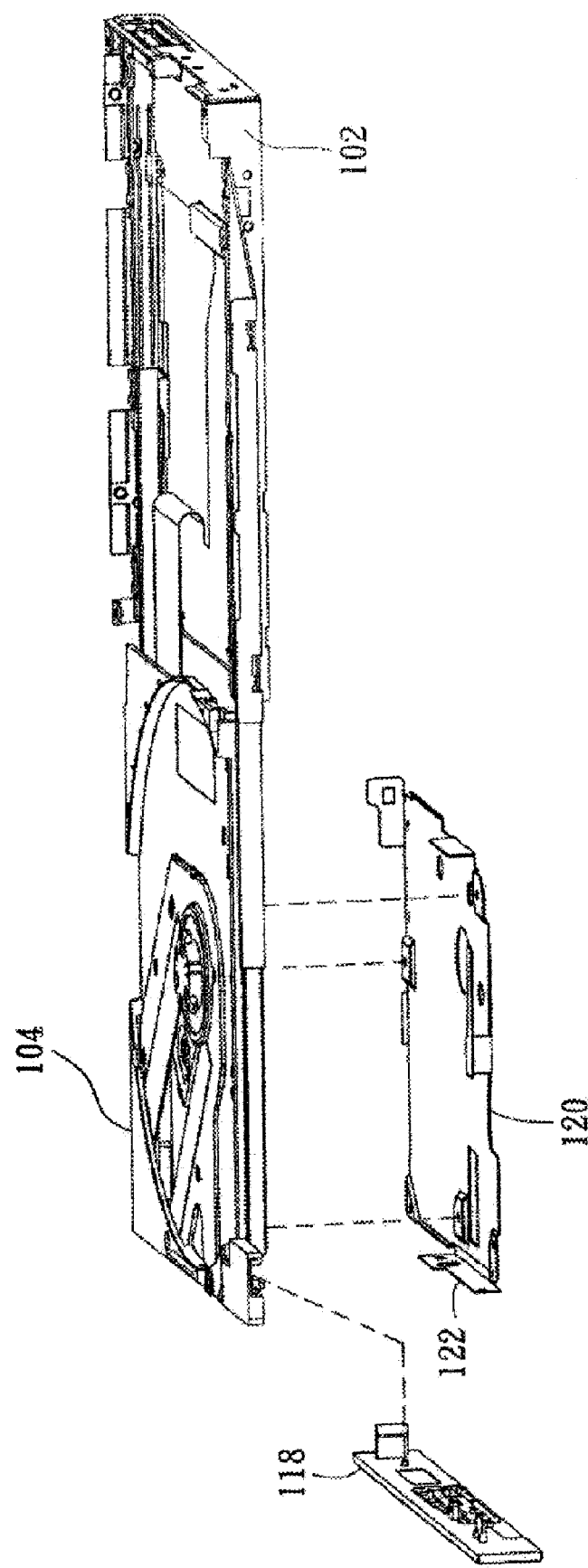
FIG. 4 is an integrated structure of the bezel and the second metal plate.

Referring to FIG. 4, the second metal plate 122 also can be integrated together with the first metal plate 120 except that the second metal plate 122 is separated from the first metal plate 120 of the base plate 116, as shown in FIG. 2. The second metal plate 122 is bended relative to the first metal plate 120. When the user pushes the eject button 126 or touches the display cover 128, electrostatic charges of the user are conducted to the base plate 116, which integrates the first metal plate 120 and the second metal plate 122, through the gap between the eject button 126 and the through hole 124a, or through the gap between the display cover 128 and the through hole 124a for grounding.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical disk drive comprising:
    a casing having a conductor to ground;
    a tray disposed in the casing, which is able to move in or out of the casing, the tray having:
        a bezel comprising a through hole and an eject button exposed and accommodated in the through hole to form a gap between the eject button and the through hole; and
        a base plate comprising a first metal plate under the tray and a second metal plate disposed at one side of the first metal plate and next to the bezel; and
    a signal wire including a conductive wire which connects the base plate with the conductor;
    wherein electrostatic charges of a user touching the tray are conducted to the conductor to discharge through the conductive wire.

2. The optical disk drive of claim 1, wherein the first metal plate is coupled to the second metal plate.

3. The optical disk drive of claim 1, wherein the second metal plate and the first metal plate are formed as a whole.

4. An optical disk drive comprising:
    a casing which is conductive material and has a first electric device;
    a tray disposed in the casing, which is able to move in or out of the casing, comprising:
        a second electric device disposed on the tray;
        a base plate including a first metal plate under the tray and a second metal plate disposed at one side of the first metal plate; and
        a bezel next to the second metal plate, disposed at one side of the tray, and having a through hole and an eject button which is exposed and accommodated in the through hole;
    a signal wire electrically connecting the first electric device with the second electric device; and
    a conductive wire disposed in the signal wire, electrically connecting the casing with the base plate;
    wherein electrostatic charges of a user touching the eject button are conducted to the casing to discharge through the base plate.

5. The optical disk drive of claim 4, wherein the signal wire is a flexible printed circuit.

6. The optical disk drive of claim 4, wherein the first electric device is a connector and the second electric device is an optical pick-up.

7. The optical disk drive of claim 4, wherein the second metal plate and the first metal plate are formed as a whole.

* * * * *